US007237236B2

United States Patent
Kershenbaum et al.

(10) Patent No.: US 7,237,236 B2
(45) Date of Patent: *Jun. 26, 2007

(54) METHOD AND APPARATUS FOR AUTOMATICALLY DETERMINING OPTIMUM PLACEMENT OF PRIVILEGED CODE LOCATIONS IN EXISTING CODE

(75) Inventors: Aaron Stephen Jay Kershenbaum, New City, NY (US); Lawrence Koved, Pleasantville, NY (US); Anthony Joseph Nadalin, Austin, TX (US); Marco Pistoia, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 677 days.

This patent is subject to a terminal disclaimer.

(21) Appl. No.: 10/226,871

(22) Filed: Aug. 22, 2002

(65) Prior Publication Data

US 2004/0040017 A1 Feb. 26, 2004

(51) Int. Cl.
*G06F 9/45* (2006.01)
(52) U.S. Cl. .................. 717/154; 717/151
(58) Field of Classification Search .......... 717/130, 717/146, 141, 144, 151, 154; 713/200, 167; 707/4; 395/186
See application file for complete search history.

(56) References Cited

U.S. PATENT DOCUMENTS 5,485,409 A * 1/1996 Gupta et al. .............. 713/200
5,826,256 A * 10/1998 Devanbu ..................... 707/4
5,909,580 A * 6/1999 Crelier et al. ............. 717/141
6,560,774 B1 * 5/2003 Gordon et al. ............ 717/146
6,604,198 B1 * 8/2003 Beckman et al. .......... 713/167
6,643,842 B2 * 11/2003 Angel et al. .............. 717/130
6,851,108 B1 * 2/2005 Syme et al. ............... 717/146

OTHER PUBLICATIONS

"Access Rights Analysis for Java", Kershenbaum et al., IBM Research Report, Oct. 2001 (14 pages). [Online][Retrieved at]<http://domino.research.ibm.com/comm/research₁₃people.nsf/pages/pistoia.pubs.html/$FILE/OOPSLAReport.pdf>.*

* cited by examiner

*Primary Examiner*—Tuan Dam
*Assistant Examiner*—Thuy Dao
(74) *Attorney, Agent, or Firm*—Duke W. Yee; Jeffrey S. LaBaw; Cathrine K. Kinslow

(57) ABSTRACT

A method and apparatus for automatically determining optimum placement of privileged code enablement locations in existing code are provided. A method invocation graph of existing code is generated and a static analysis of the method invocation graph is performed. The static analysis is used to analyze the permission propagation through chains of method invocations in the method invocation graph. When a method invocation in the method invocation graph satisfies one or more user definable criteria, the location in the method invocation graph is saved to a file that identifies recommended insertion points for a call to the authorization enablement code. This file may then be used to manually review the code to determine if a call to privileged mode enablement should actually be made at the identified locations. Alternatively, the call to privileged mode enablement may be automatically inserted at the indicated locations using refactoring.

28 Claims, 5 Drawing Sheets

METHOD AND APPARATUS FOR AUTOMATICALLY DETERMINING OPTIMUM PLACEMENT OF PRIVILEGED CODE LOCATIONS IN EXISTING CODE

BACKGROUND OF THE INVENTION

1. Technical Field

The present invention is directed to an improved data processing system and, in particular, an improved mechanism for determining optimum placement of privileged code locations in existing code.

2. Description of Related Art

In Javar™ Development Kit (JDK™) version 1.1, local applications and correctly digitally signed remote programs were generally trusted to have full access to vital system resources, such as the file system. Unsigned remote programs were not trusted and could access only limited resources. A security manager was responsible for determining which resource accesses were allowed.

In the Java™ 2 platform, the security architecture is policy-based and allows for fine-rained access control. In Java™ 2, when code is loaded by the class loader, it is assigned to a protection domain that contains a collection of "permissions" based on the security policy currently in effect. Each permission specifies a permitted access to a particular resource, such as "read" and "write" access to a specified file or directory, or "connect" access to a given host and port. The policy, specifying which permissions are available for cod. from various signers and/or locations, can be initialized from an external configurable policy file. Unless a permission is explicitly granted to code, that code cannot access the resource that is protected by that permission. These concepts of permission and policy enable the Java™ 2 runtime environment to offer fine-grain, highly configurable, flexible, and extensible access control. Such access control can be specified not only for applets, but also for all Java™ code including but not limited to applications, JavaBeans™, and servlets.

The Javar™ 2 security architecture imposes the constraint that whenever a protected resource access is attempted, each class whose method is in the execution stack is checked for the required permission to access that resource. The security policy would be ineffective if code with insufficient permissions were able to invoke code with more permissions and by doing so, access system resources that it should not access by virtue of its own protection domain.

However, there is a case where this rule does not apply. If some code on the thread, i.e. methods on an execution stack, is granted the requested permission and is marked as privileged, then none of the previous callers are checked for the required permission. To mark code as privileged, it is necessary to make a call to the java.security.AccessController.doPrivileged( ) method. A piece of code that is marked as privileged is enabled to temporarily grant other code in the thread stack permissions that otherwise would not have been granted by virtue of their protection domains.

The doPrivileged( ) method was introduced in the Java™ 2 platform to avoid client code from requiring the permissions that library code, which is more trusted, may require. For example, an underlying Application Program Interface (API) method can be invoked by client code to open a socket connection. Whatever code is found on the thread of execution when the socket connection is opened will need to be granted a SocketPermission. However, before opening the socket connection, that method writes to a log file that a socket connection is going to be opened. The library code needs a FilePermission to do that, but it would not make sense to impose the requirement that the client code also have that FilePermission. To prevent the propagation of the FilePermission requirement, the code that writes to the log file must be wrapped in a doPrivileged( ) method call.

An example of how privileged code works is shown in FIG. 5. FIG. 5 illustrates a thread stack in which classes are called in a downward direction. Thus, for example, class 1 calls class 2 and class 2 calls class 3, and so on. The last class called in the thread stack is typically a call to the method AccessController. checkPermission( ). The checkPermission( ) method traverses the thread stack from the bottom of the stack to the top of the stack checking each method's class' permissions to make sure that they each have the required permissions to access a protected resource.

Assume that class 3 calls the doPrivileged( ) method. The doPrivileged( ) method basically stops the checkPermission( ) method from continuing its checks beyond that class. In this way, the doPrivileged( ) method call effectively grants the privileges necessary to access the protected resource to the classes higher up in the thread stack. Thus, only classes called after doPrivileged( ), i.e. lower in the stack, need have the required privilege to access the protected resources.

Once library code has been written, it is often difficult, if not impossible, to manually predetermine which portions should be wrapped in doPrivileged( ) calls. Developers have to manually review all of their code and/or run sample client code against their libraries to find out when that client code requires unnecessary permissions, and from there argue that a call to doPrivileged( ) is required in their library. However, especially when a large amount of library code is involved, this activity can be very tedious and error prone. If a call to doPrivileged( ) is necessary, but is not detected during the manual review of the code or the testing phase, the resulting code will be unstable and client code may invoke a particular path of execution that will generate a SecurityException. On the other hand, if a call to doPrivileged( ) is mistakenly inserted in a place where it is not required, client code will be temporarily granted unnecessary permissions, thus violating the "Principle of Least Privilege" and opening a security hole.

This problem shows up particularly when library code that was written in JDK™ 1.0 and 1.1 platforms, where the described authorization mechanism was absent, is ported to Java™ 2. In this case, any calls to doPrivileged( ) must be inserted from scratch.

Thus, it would be beneficial to have an apparatus and method that automatically determines where a call to doPrivileged( ) should be made in existing code. Furthermore, it would be beneficial to have an apparatus and method that automatically inserts a call to doPrivileged( ) in existing code and generates a new class or method that includes proper privileges without granting unnecessary privileges.

SUMMARY OF THE INVENTION

The present invention provides a method and apparatus for automatically determining optimum placement of privileged code locations in existing code. With the apparatus and method of the present invention, a method invocation graph of existing code is generated and a static analysis of the method invocation graph is performed. The static analysis is used to analyze the permission propagation through chains of method invocations in the method invocation graph.

When a method invocation in the method invocation graph satisfies one or more user definable criteria, the location in the method invocation graph is save to a file that identifies recommended insertion points for a call to the doPrivileged( ) method.

A default criteria for insertion of a call to doPrivileged( ) is the boundary between client code and API code. Thus, if no other points in the chain of method invocations satisfies the user definable criteria for insertion of a call to doPrivileged( ), the location at which the boundary between client code and API code is identified is written to the recommended doPrivileged( ) location file. This file may then be used by the user to manually review the code to determine if a call to doPrivileged( ) should actually be made at the identified locations. Alternatively, the call to doPrivileged( ) may be automatically inserted at the indicated locations using refactoring.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism by which the portions of existing code where a call to doPrivileged( ) would be beneficial are automatically determined. In addition, the present invention may further insert a call to doPrivileged( ) in the identified locations of the existing code and generate a new class or method that has the appropriate privileges for accessing protected resources without granting unnecessary permissions. In this way, a developer need not manually go through existing code and perform tests on portions of the code to identify possible areas where a doPrivileged( ) call may be beneficial. Thus, human error is avoided such that areas where a call to doPrivileged( ) is needed are not missed by the human developer and a call to doPrivileged( ) is not inserted in areas of code where it is not needed.

The preferred embodiments of the present invention will be described with regard to the Java™ 2 platform, however the present invention is not limited to use with Java™ 2. Rather, the present invention may be used in any environment in which security policies are utilized to protect access to computer system resources, such as operating systems and the like. Thus, the references to Java™ 2 and elements of this programming environment are only intended to be exemplary and are not intended to imply any limitation on the present invention.

Since the present invention, according to the following exemplary embodiments, operates in a Java™ security environment, a brief description of the Java™ computing environment will be provided. As is well known, Java™ is typically used in a client/server or other distributed data processing environment, although Java™ may also be used on a single computing device as well. As such, the following description of the Java computing environment will assume a client/server environment although the present invention may also be used by a single computing device with or without a network connection.

Figure 1:
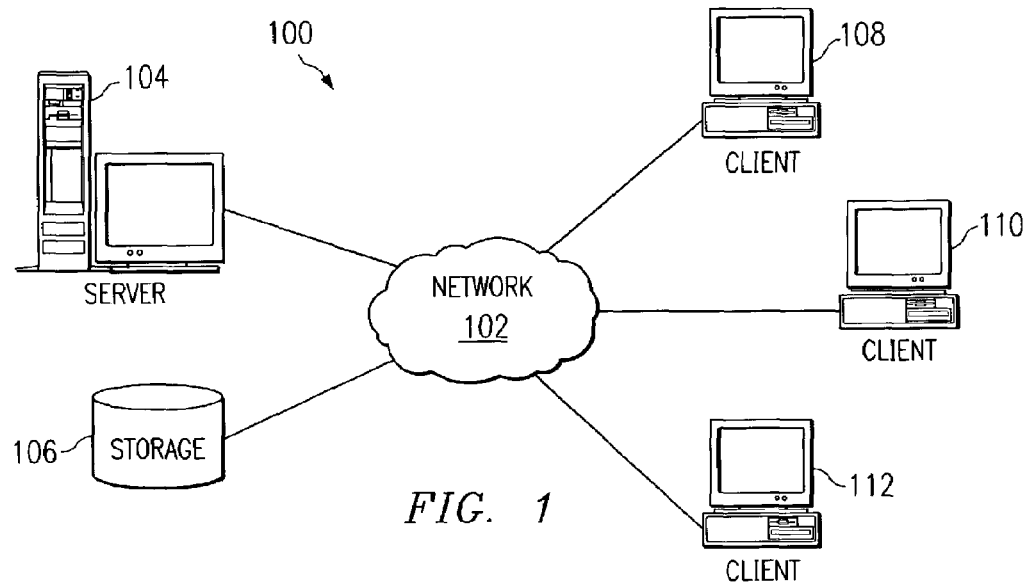
FIG. 1 is an exemplary diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
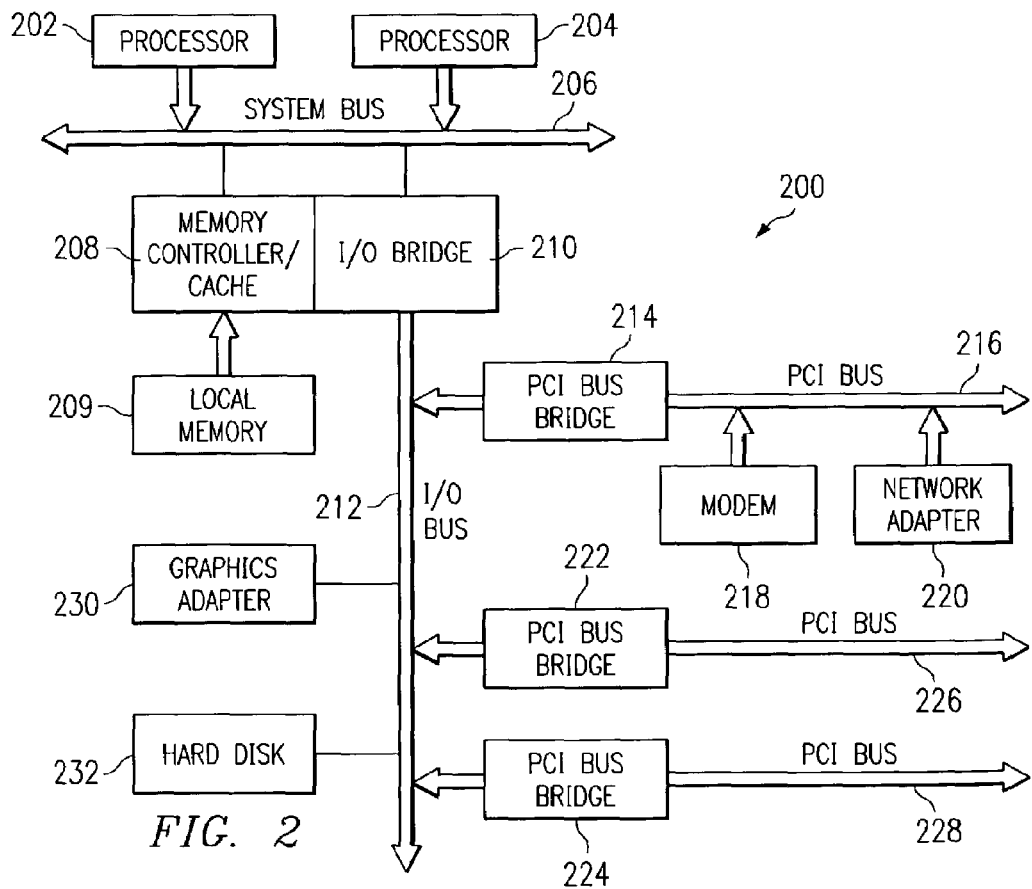
FIG. 2 is an exemplary diagram of a server computing system according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® e-Server™ pSeries® system, a product of International Business Machines Corporation In Armonk, New York, running to Advanced Interactive Executive (AIX®) operating system or the LINUX® operating system.

Figure 3:
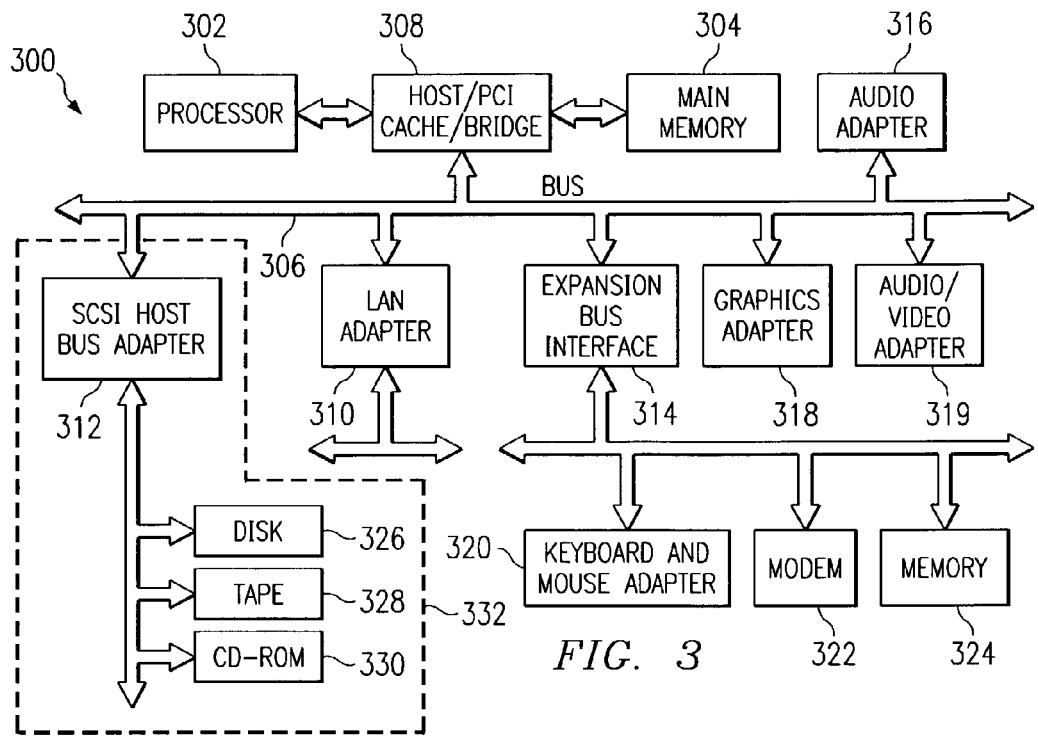
FIG. 3 is an exemplary diagram of a client computing system according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® 2000, which is available from Microsoft® Corporation. An object oriented programming system such as Java™ may run in conjunction wit the operating system and provide calls to the operating system from Java™ programs or applications executing on data processing system 300. "Java" is a trademark of Sun Microsystems, Inc. Instructions for the operating system, to object-oriented operating system and applications or programs are located on storage devices, such as hard disk drive 326, and maybe be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
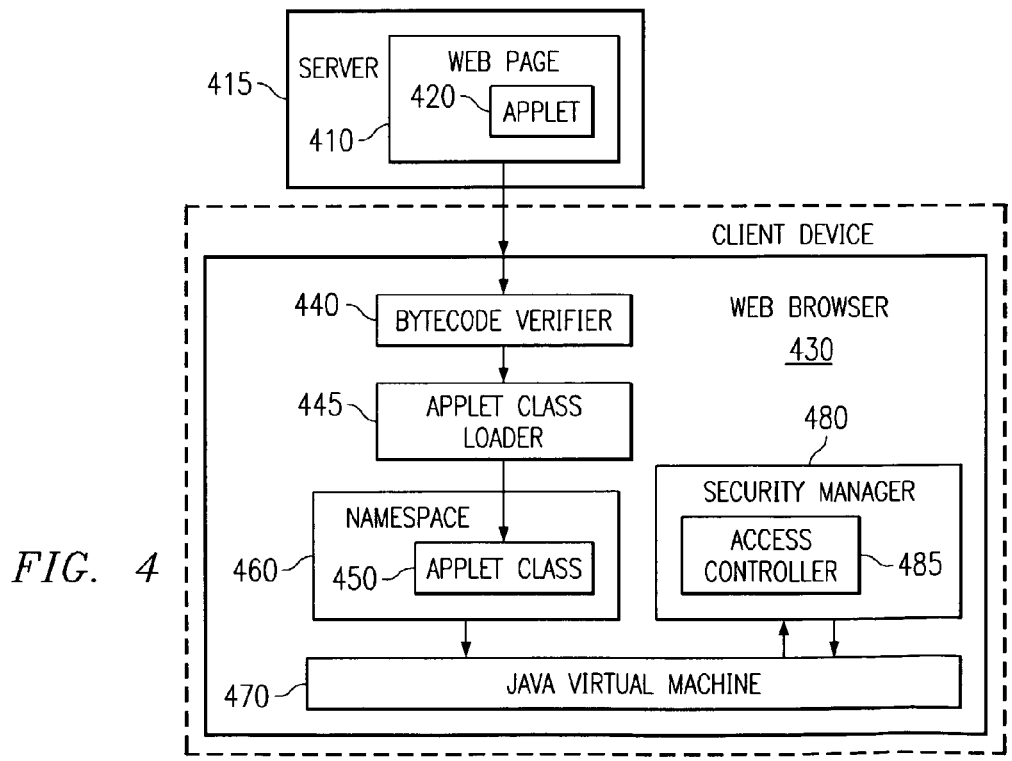
FIG. 4 is an exemplary diagram illustrating a Java™ Virtual Machine.
Figure 5:
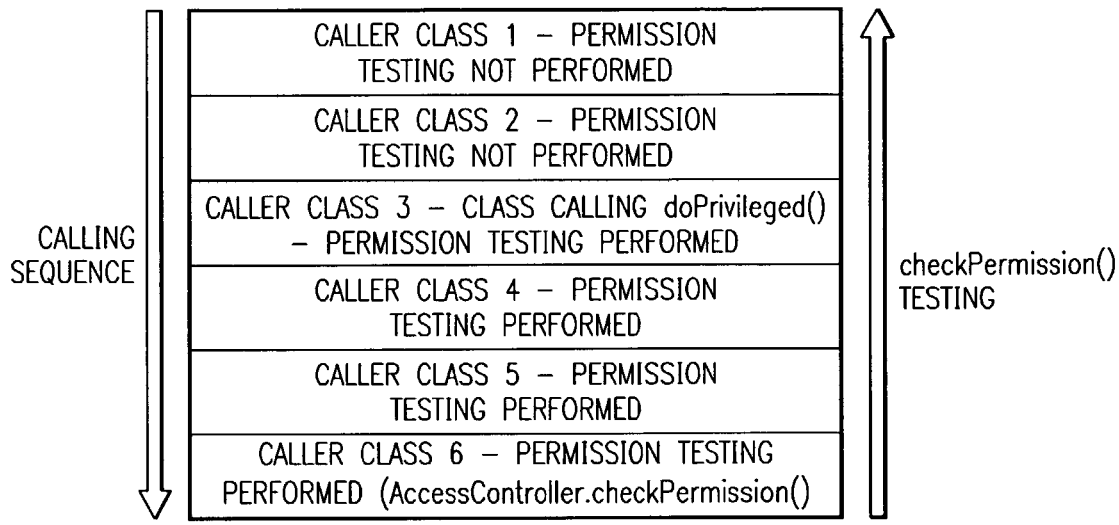
FIG. 5 is an exemplary diagram illustrating a method calling sequence and checkPermission( ) testing sequence.

FIG. 4 shows how a Java™ applet is bandied using a Java™ Virtual Machine (JVM™) that implements the Java™ 2 security architecture. As shown in FIG. 4, a Web page 410 may include a hyperlink, or the like, to a Java™ applet 420. When a user of te Web browser 430 selects the hyperlink, or otherwise Initiates the download of the applet 420, the applet code is fetched from the server 415 associated wit the applet 420. The fetched code is verified by a byte-code verifier 440 and the applet is instantiated as a class or set of classes 450 in a namespace 460 by a class loader 445. At the time to classes 450 of the applet are instantiated, the JVM™ 470 also builds a protection domain for the applet 420. The protection domain is a data structure in which a set of permission collections are present. A permission collection is a grouping of permissions defined by a developer. Every time a developer defines a new permission, the developer must also define a permission collection to which the new permission belongs or assume the default implementation. These permission collections may be assigned to classes 450 of the applet 420. Thus, when the classes are instantiated, the JVM™ looks at the permission collections assigned to the classes and generates a protection domain using the assigned permission collections.

The bytecode is then executed by the JVM™ 470. The bytecode is executed as threads of execution. A thread is a stream of execution. Threads allow multiple streams of execution to occur virtually simultaneously in a data processing system thereby allowing multitasking. An executing thread has a thread stack. The thread stack is a mechanism for tracking which method calls which other method in order to be able to return to the appropriate program location when an invoked method has finished its work.

During execution, the bytecode may make calls to potentially dangerous, or untrusted, functionality. When such a call is made by a thread of execution, the Security Manager 480 calls a SecurityManager.checkPermission( ) method which in turn calls an AccessController.checkPermission( ) method of the Access Controller 485. The Security Manager 480 is the part of a JVM™ that enforces the security policy of the computing system on which the JVM™ is resident. When an untrusted operation is to be performed by an application, the Security Manager 480 is responsible for checking whether the application has the appropriate permission for performing the operation. The Security Manager does this by invoking the Access Controller 485.

A permission represents the right to access to a resource. In order for a resource access to be allowed, the corresponding permission must be explicitly granted to the code attempting the access. A permission typically has a name and, in some cases, a comma-separated list of one or more actions. For example, the following code creates a FilePermission object representing read access to the file named abc in the /tmp directory:

perm=new java.io.FilePermission("/tmp/abc", "read");

In this permission, the target name is "/tmp/abc" and the action string is "read".

It is important to note that the above statement creates a permission object that represents, but does not grant access to, a system resource. Permission objects are constructed and assigned, or granted, to code based on the policy in effect. When a permission object is assigned to code, that code is granted the permission to access the protected resource specified in the current security manager when making access decisions. In this case, the (target) permission object is created based on the requested access, and checked against the permission objects granted to and held by the code making the request.

The security policy for an application environment is represented by a Policy object. In the default Policy file implementation of Policy, the policy can be specified within one or more policy configuration files. The policy file(s) specify what permissions are allowed for code from specified code sources. A sample policy file entry granting code from the /home/sysadmin directory read access to the file /tmp/abc is:

grant codeBase "file:/home/sysadmin/" {Permission java.io.FilePermission "/tmp/abc", "read"; };

In the Java™ Development Kit 1.1 it was the responsibility of the Security Manager to directly call a check( ) method on untrusted resource access requests in, order to determine if the resource access request should be granted. In Java™ 2, is the SecurityManager 480 that calls the AccessController.checkPermission( ) method on permission objects.

When the AccessController.checkPermission( ) method is called on a permission object, the AccessController 485 retrieves the AccessControlContext for a thread of execution that resulted in the call of the AccessController.checkPermission( ) method. The AccessControlContext is a set of protection domains for the classes in the thread stack. The protection domain is a CodeSource and a permission collection. The CodeSource is a combination of an origination location of the code and a set of zero or more digital certificates.

Having retrieved the AccessControlContext, the AccessController 485 calls an AccessControlContext.checkPermission( ) method on the AccessControlContext. The AccessControlContext.checkPermission( ) method calls an AccessControlContext.implies( ) method on each protection domain identified in the AccessControlContext to determine if the particular permission being checked is implied by each of the ProtectionDomain objects. This causes an implieso method to be called on each PermissionCollection in each of the protection domains. This, in turn, causes an implieso method to be called on each permission in each PermissionCollection. In this way, each permission in each PermissionCollection of each protection domain identified in the AccessControlContext is checked to see if it implies the permission being checked.

If the results of this check indicate that any one of the protection domains does not imply the requisite permission, i.e. the permission being checked, then the requested resource access is denied. Thus, all protection domains identified by the AccessControlContext must imply the permission being checked in order for the access request to be granted. This enforces the requirement that each protection domain include at least one permission collection that implies the permission being checked.

As mentioned previously, rather than expressly granting each class and/or method the requisite permissions to access a resource, a developer of the code may make a call to doPrivileged( ) which causes the checkPermission( ) method to stop at the method calling doPrivileged( ) and assume that any callers of that method have the required permissions. In this way, the method calling doPrivileged( ) temporarily grants authorization to methods higher in the execution stack which do not already have that permission.

The doPrivileged( ) method call is a powerful tool but can lead to security holes that are not desirable. If doPrivileged( ) is used improperly, authorization may be granted to protected resources improperly so that methods that should not be granted such permissions are allowed to access protected resources. Thus, it is important that a developer of code be cognizant of the security holes that may be created by the use of doPrivileged( ) and use this method call only where necessary. Such a determination of where to use the doPrivileged( ) call is time consuming and prone to human error.

The present invention alleviates these problems by providing an automated mechanism for identifying points in code where a call to doPrivileged( ) is appropriate and optionally, a mechanism for automatically inserting the call to doPrivileged and generating a new class or method that has the appropriate permissions for accessing the protected resources.

With the apparatus and method of the present invention, a static analysis of code (the term "code" as it is used herein is intended to refer to either bytecode, source code or other form suitable for analysis, including but not limited to UML) is performed and a method invocation graph is created that identifies all possible paths of execution (as well, possibly, as other paths not actually executable). Places in the code where calls to doPrivileged( ) may be required are then identified. This analysis is performed without running the code. This analysis may be performed on application code, i.e. code that has a specific entry point (such as the main( ) method for an application or the init( ) method of an applet) or on library code, i.e. code that does not have specific entry points but exposes its public, protected, and sometimes default methods for client code to invoke.

The static analysis of the code involves traversing the code and identifying method invocations, their parameters, and allocation types in the code. As the code is traversed, branches of execution are identified based on the identified method invocations. From this information, a method invocation graph that resembles a graph structure may be generated that represents all the possible branches of execution in the analyzed code. See C. Chambers, D. Grove, G. DeFouw and J. Dean. *Call graph construction in object-oriented languages*. Proceedings of the ACM SIGPLAN Conference on Object Oriented Programming Systems, Languages and Applications (OOPSLA 1997), 108–124, Oct. 5–9, 1997. ACM Press, New York, which is hereby incorporated by reference.

Figure 6:
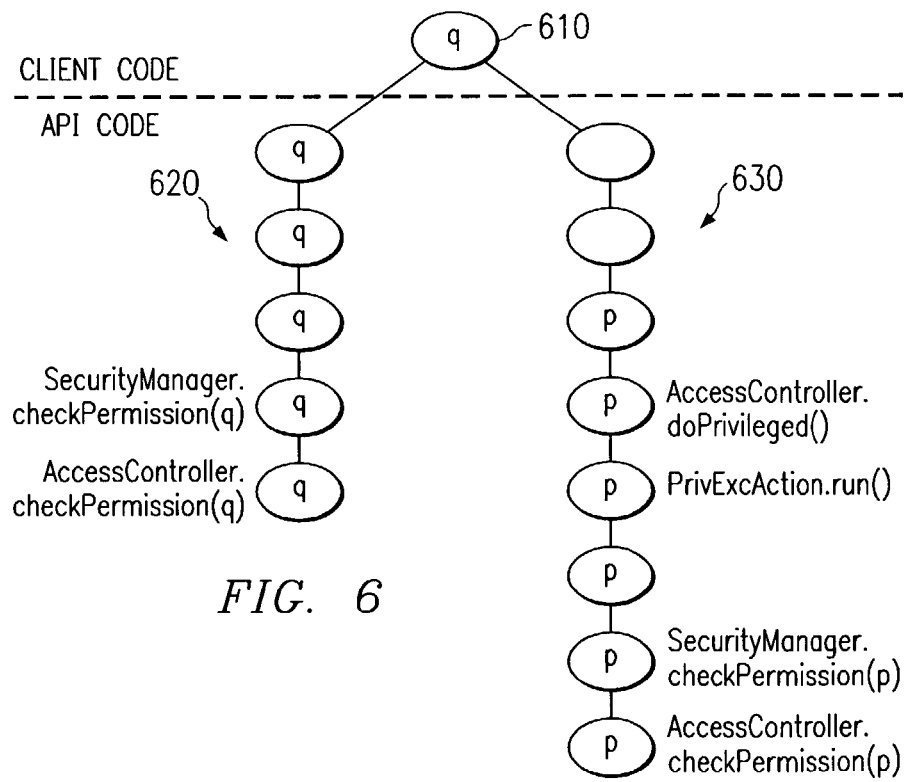
FIG. 6 is an exemplary diagram illustrating permission propagation up a method invocation chain in a method invocation graph.

An example of a simplified method invocation graph obtained through static analysis is shown in FIG. 6. As shown in FIG. 6, client code 610 calls API code represented by the branches 620 and 630. The branches 620 and 630 include a chain of method calls some of which may require permissions to access protected resources. This chain of method calls resembles the thread stack that is created when the code is running. The present invention analyzes these chains of method calls, i.e. branches or paths of execution in the method invocation graph, and determines where a call to doPrivileged( ) may be necessary.

As shown in FIG. 6, the branch 620 contains a chain of method calls terminating in a call to SecurityManager.checkPermission(q) and a call to AccessController.cheekPermission(q). Thus) the chain of method calls in branch 620 is traversed from the bottom of the chain to the top of the chain and the permissions associated with each method call are checked to see if they include the permission q. If a method is called that does not have the permission q, and that method is required to have permission q in accordance with the Java™ 2 security mechanisms, a security exception may occur.

Thus, for example, as shown in the branch 620, since there is no call to doPrivileged( ) in the chain of method calls, each method call must have the permission q. This requirement extends all the way to the client code that called the API code. As mentioned previously, it is desirable not to always impose the permission requirements of the API code on the client code and thus, it would be beneficial to have a call to doPrivileged( ) in the chain of method calls in branch 620 so that the requirement to have permission q does not extend to the client code.

Similarly, the chain of method calls in branch 630 terminates in a call to SecurityManager.check Permission(p) and AccessController.checkPermission(p). However, in this chain of method calls there is a call to AccessController.doPrivileged( ). As can be seen, because of the call to doPrivileged( ), the requirement that the methods be granted the permission p stops with the method that called doPrivileged( ). As a result, the client code 610 need not have the permission p expressly granted to it.

The present invention models the operation of the checkPermission( ) method call by traversing each branch of possible execution in the method invocation graph generated by the static analysis to determine branches where a doPrivileged( ) method call may be necessary to ensure proper propagation of permission requirements up the chain of method calls. With the present invention, the permission requirement for a chain of method calls is identified from the parameters associated with the AccessController.checkPermission( ) method call. This process continues all the way up to the calling client code or until a call to doPrivileged( ) is encountered.

As the chains of method invocations, or calls, is traversed, the present invention determines if any of the method calls satisfy a predetermined set of user definable criteria. This user definable criteria may be, for example, a first place in the chain of method calls identified as not needing the required permission. Examples of other criteria may be at a package boundary, where one or more packages have permission, but others do not. For example, this boundary may be a boundary where an unauthorized package calls an authorized package.

If any of the method calls satisfy the user definable criteria, the location within the chain of method calls is identified as a recommended place in which a call to doPrivileged( ) should be inserted. This location is stored in a file which may later be used by a developer or other human user to identify places where a call to doPrivileged( ) may be inserted, or used by a tool to automatically refactor the code to include the doPrivileged( ) call.

As a default set of criteria, a call to doPrivileged( ) may be inserted at the boundary between the client code and the API code called by the client code. This boundary can be identified in the code based on the particular class loader used to load the class of the method being called. That is API code is loaded by a different class loader than the class loader for client code. This boundary may be identified as part of the static analysis used to generate the method invocation graph. Each node in the method invocation graph is uniquely identified by its calling context: the method being invoked, the receiver and the parameters.

Thus, as the present invention traverses each path of nodes, representing context-sensitive method calls, the permissions associated with each node are propagated to the node's predecessors recursively. If a predetermined criterion is satisfied during this traversal, the location where the criterion is satisfied is identified and an entry added to a file in which such locations for possible calls to doPrivileged( ) are stored. For example, the name of the method called at this location may be stored such that this method may be modified to include a call to doPrivileged. Since the method invocation graph is context sensitive, the present invention can be as precise as reporting the class name, method name, and line number where the call to doPrivileged( ) should be inserted.

If the predetermined criteria is not satisfied, the traversal continues until the boundary between client code and API code is encountered. At this point, the file storing the location of possible calls to doPrivileged( ) is updated to include the boundary location, e.g., the name of the API method invoked by the client code.

It should be noted that if during the traversal of a path of nodes representing method calls, a call to doPrivileged( ) is encountered, the traversal of the path of nodes does not continue up the remainder of the path. Rather, the analysis according to the present invention is continued with the next path in the method invocation graph. There is no need to write information to the file containing the recommended locations of calls to doPrivileged( ) because a call to doPrivileged( ) already exists for that chain of possible execution.

Figure 7:
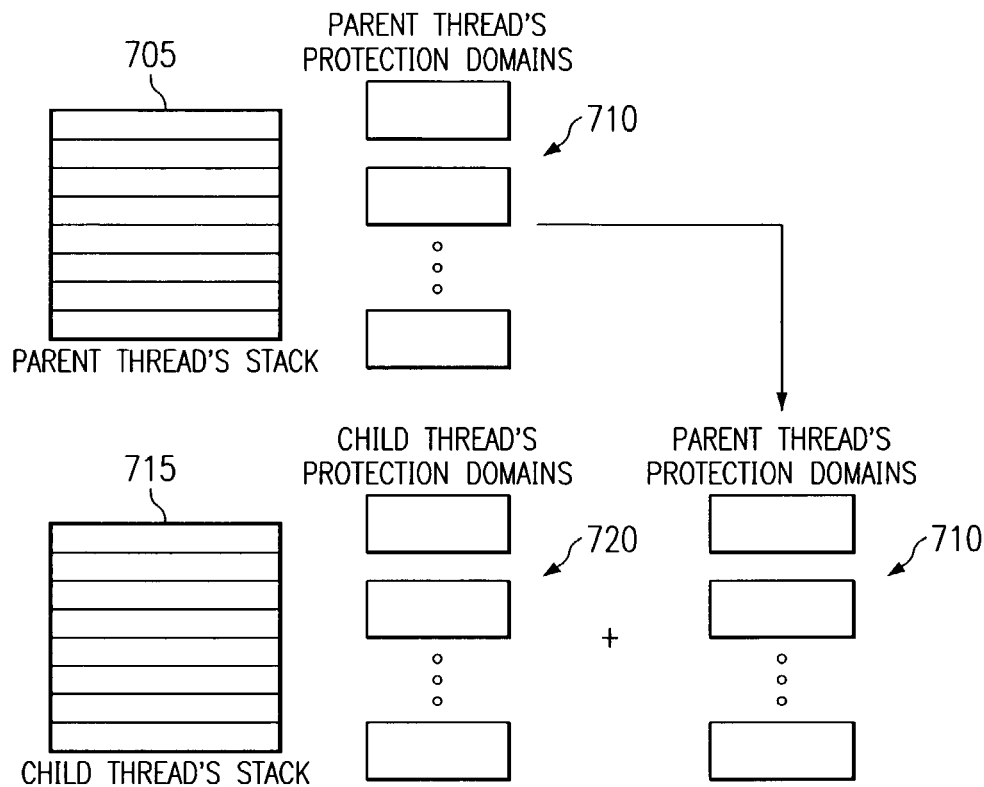
FIG. 7 is an exemplary diagram illustrating protection domains of a parent and child thread stack in a multithreaded environment.

The methodology of the present invention extends to multithreaded code as well. With multithreading, as shown in FIG. 7, a parent thread's execution stack 705 has a first set of protection domains 710. A child thread, i.e. a thread of execution called by the parent thread, has a stack of execution 715 having a second set of protection domains 720. A problem arises in that the child thread may be granted permissions that are not granted to the parent thread. As a result, a security hole is created such that access to a protected resource may be obtained through the child thread when such access is not obtainable through the parent thread.

In order to avoid such problems, the Java™ 2 security architecture require that the methods of the parent thread have the permissions to access the protected resource that are required by the child thread or else a call to doPrivileged( ) is present in the path of nodes representing method calls.

Figure 8:
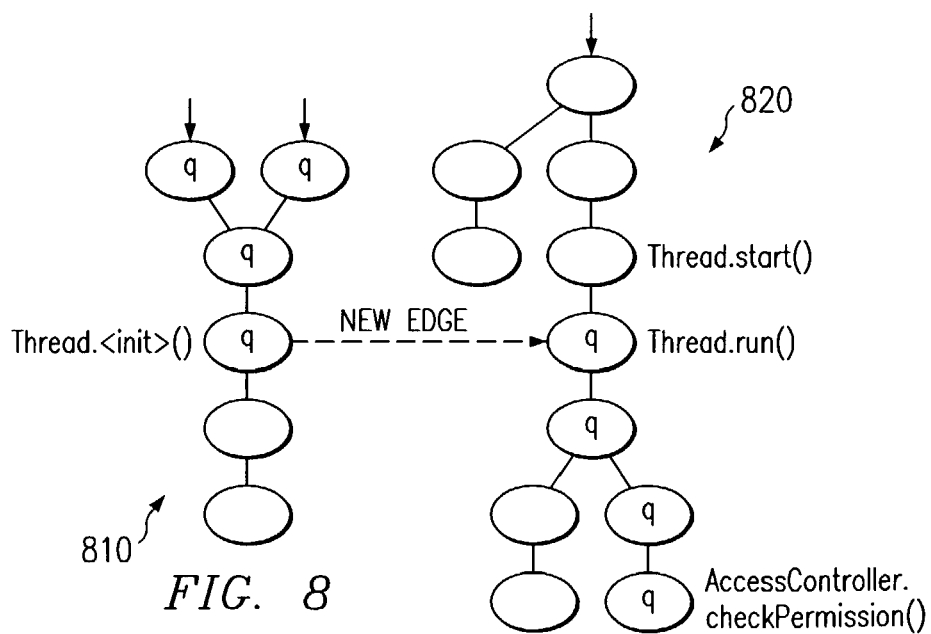
FIG. 8 is an exemplary diagram illustrating the creation of fictitious edges in a method invocation graph so as to handle permission propagation in a multithreaded environment.

As shown in FIG. 8, in order to perform static analysis on multithreaded code to identify locations where a call to doPrivileged( ) may be beneficial, fictitious edges are drawn between nodes of the method invocation graph that invoke nodes of other paths of execution. This fictitious edge provides a bridge between paths of execution across which the permission requirements continue up the paths of method calls.

For example as shown in FIG. 8, the call to AccessController.checkPermission(P) is in the branch of execution 820, which does not involve Thread.<init>( ). However, to enforce the fact that the methods of the parent thread have the required permissions to access the protected resource, a fictitious edge is created between the node Thread.<init>( ) and the node Thread.run( ) across which the permission requirement to have the permission p granted to the method or otherwise have a call to doPrivileged( ) is extended.

The node Thread.start( ) and those above it, as well as the nodes below Thread,<init>( ) do not require permission p because, according to the JavaT™ 2 security model, the nodes Thread.start( ) and above and the nodes below Thread.<init>( ) do not inherit the permission requirement for p from their predecessors. Thus, the propagation of the permission requirement for p performed by the present invention prevents the permission requirement for p from propagating along the relevant edges.

The above embodiments of the present invention are described as providing an identification of locations within code where calls to doPrivileged( ) may be necessary through the use of a static analysis of the permissions assigned to methods in a graph of method invocations. In addition to automatically identifying these locations, the present invention may automatically insert the calls to doPrivileged( ) in the source code (if available) or bytecode at these identified locations. As a result, new classes and methods may be generated by "refactoring" these portions of bytecode. The general concept of "refactoring" is known and is described, for example, at <www.refactoring.com>. Therefore, a detailed description of refactoring to generate new classes and methods will not be included here. It should be appreciated that while the general concept of refactoring is known, the use of refactoring with the mechanisms of the present invention is not known prior to the invention described herein.

Figure 9:
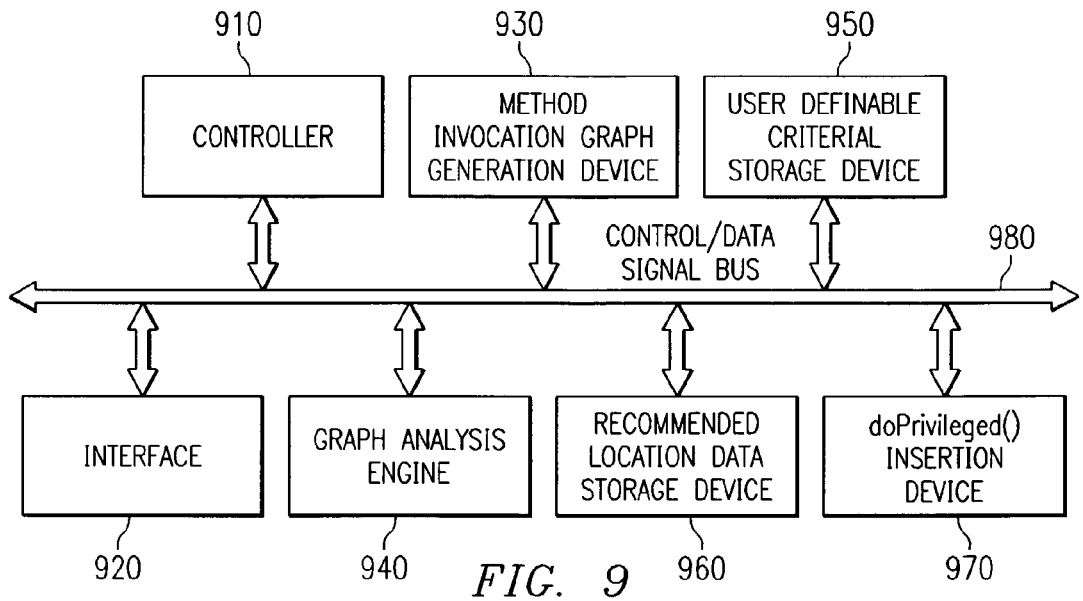
FIG. 9 is an exemplary block diagram of a doPrivileged( ) static analysis device in accordance with the present invention.

FIG. 9 is an exemplary block diagram illustrating a doPrivileged( ) static analysis device in accordance with an exemplary embodiment of the present invention. The elements shown in FIG. 9 may be implemented as hardware, software, or any combination of hardware and software without departing from the spirit and scope of the present invention. In a preferred embodiment, the elements shown in FIG. 9 are implemented as software instructions executed by one or more processing devices.

As shown in FIG. 9, the doPrivileged( ) static analysis device includes a controller 910, an interface 920, a method invocation graph generation device 930, a graph analysis engine 940, a user definable criteria storage device 950, a recommended location data storage device 960, and a doPrivileged( ) method call insertion device 970. These elements 910–970 are in communication with one another via the control/data signal bus 980. Although a bus architecture is shown in FIG. 9, the present invention is not limited to such and any architecture that facilitates communication between the elements 910–970 may be used without departing from the spirit and scope of the present invention.

The controller 910 controls the overall operation of the doPrivileged( ) static analysis device and orchestrates the operation of the other elements 920–970. The controller 910 receives the code to be analyzed via the interface 920 and provides this code to the method invocation graph generation device 930. The code may be received from a local computing device or a remotely located computing device. For example, the code may be received from a client device coupled to a network to which the doPrivileged( ) static analysis device is coupled and acts as a server to the client device.

The method invocation graph generation device 930 performs a static analysis of the code received and generates a method invocation graph based on the identified method invocations in the code. This method invocation graph is then stored in a temporary storage where it may be accessed by the other elements 940–970 to perform their respective operations. The method invocation graph generation device 930 may return an indication to the controller 910 once the method invocation graph has been generated.

The controller 910 then instructs the graph analysis device 940 to perform a permission analysis on the generated method invocation graph to identify locations where a call to doPrivileged( ) are recommended. This analysis may include determining locations in the method invocation graph where predetermined user definable criteria and/or default criteria are satisfied, as identified by the user definable criteria storage device 950. As this analysis is being performed, the graph analysis device 940 writes information about the identified locations where a doPrivileged( ) call are recommended to the recommended location data storage device 960. These recommended locations may then be output by the controller 910 via the interface 920 to an output device for review by a human user.

Alternatively, or in addition to outputting the recommended locations to a human user, the doPrivileged( ) method call insertion device 970 may make use of the entries in the recommended location data storage device 960 to automatically insert calls to doPrivileged( ) in the source code or bytecode and thereby, automatically update the code to be in conformance with Java™ 2 security requirements.

Figure 10:
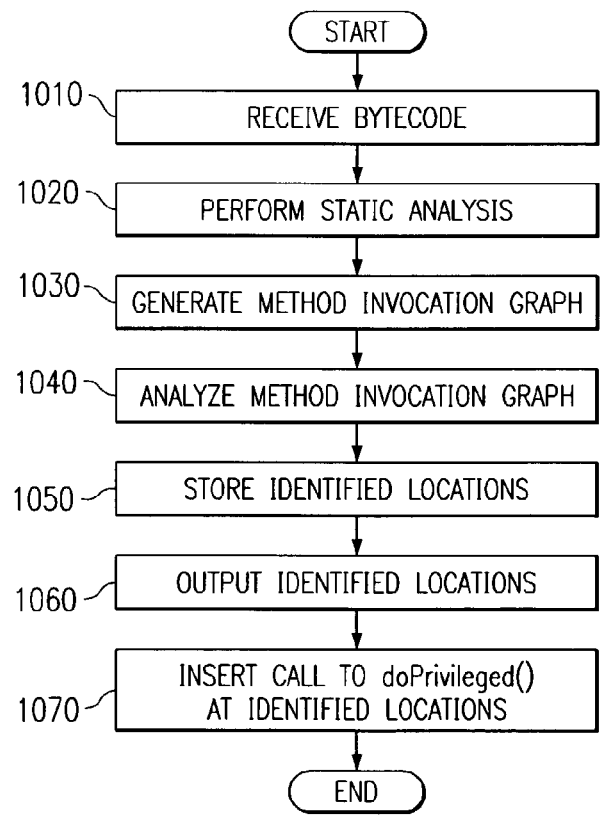
FIG. 10 is a flowchart outlining an exemplary operation of the present invention.

FIG. 10 is a flowchart outlining an exemplary operation of the present invention. As shown in FIG. 10, the operation starts with receipt of code (step 1010). A static analysis is performed on the code (step 1020) and a method invocation graph is generated (step 1030). The method invocation graph is then analyzed to identify locations where calls to doPrivileged( ) are recommended (step 1040). These locations are stored in a file for later use (step 1050). The identified locations may then be output for review by a user (step 1060). Optionally, calls to doPrivileged( ) may be inserted in the code at the identified locations (step 1070) and the operation ends.

Thus, the present invention provides an automated mechanism for analyzing code to identify locations where calls to doPrivileged( ) may be necessary or desirable. The present invention further provides a mechanism that may automatically insert such calls to doPrivileged( ) at the identified locations. Through use of the present invention human error in being over-inclusive or under-inclusive in the use of calls to doPrivileged( ) is avoided.

The above embodiments describe the present invention in terms of a system and method for identifying placement of an operation to implement a privileged mode, e.g., a call to AccessController.doPrivileged( ), in a chain of method calls. This same technique can also be used to check existing code to determine if the actual placement of an operation to implement a privileged mode is proper.

The present invention may be used to check the conditions surrounding a call to doPrivileged( ) for example, in order to flag instances where a programmer may need to revisit or rethink the placement of the call to doPrivileged( ). For example, while traversing the chain of method calls in the manner discussed above, if a call to doPrivileged( ) is identified, a check of the surrounding conditions may be made to determine if the call to doPrivileged( ) should be flagged for further inspection by a programmer. In such a case, information about the chain of method calls may be compiled and compared against a rule base that identifies when a particular call to doPrivileged( ) should be flagged for further inspection.

As an example, assume that there is a chain of method calls that includes a call to doPrivileged( ). However, the chain of method calls does not include a call to AccessController.checkPermission( ). Since there is no call to AccessController.checkPermission( ) there is no propagation of a permission requirement up the chain of method calls and, therefore, no need for a call to doPrivileged( ). Thus, this unnecessary call to doPrivileged( ) may be flagged for further inspection by a programmer.

As another example, assume that a chain of method calls has two calls to doPrivileged( ) in the chain. When a method calls doPrivileged( ), its callers are temporarily enabled its Permissions. Therefore, there is no need for two calls to doPrivileged( ) in the same chain of method calls. Thus, again, the second call to doPrivileged( ) is unnecessary. This second call to doPrivileged( ) may be flagged for further inspection by a programmer.

As yet another example, assume, for example, that the first and second methods in the chain of method calls are designated as being limited in the types of Permissions that they should be granted. This may be specified in an electronic data file or the like, which may be used by the present invention to determine constraints on the granting of Permissions through the use of calls to doPrivileged( ).

When a call to doPrivileged( ) is encountered during the operation of the present invention, a check may be made as to whether any of the method calls higher in the chain of method calls corresponds to one of the methods in this data file. From the call to doPrivileged( ) a determination may be made as to what Permissions are being granted to this method call as a result of calling doPrivileged( ). If these Permissions include Permissions that are not in the list of Permissions designated in the data file, this call to doPrivileged( ) may be flagged for further inspection by a programmer.

Of course, the possible scenarios where a call to doPrivileged( ) may be flagged for further inspection are numerous and all of them cannot be set forth herein. However, the present invention provides a mechanism for checking such possibilities through comparison to a rule base indicating that if certain conditions exist in a chain of method calls that includes a call to doPrivileged( ), the call to doPrivileged( ) should be flagged for further inspection. Thus, in addition to an automated mechanism for analyzing code to identify locations where calls to doPrivileged( ) may be necessary or desirable, the present invention also provides a mechanism for checking existing calls to doPrivileged( ) to determine if conditions exist where the call to doPrivileged( ) should be revisited by the human programmer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as floppy disks, hard disk drives, RAMs, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for optimizing code based on required permissions, comprising:
performing analysis on the code to identify paths of execution in the code;
identifying one or more locations in the paths of execution of the code where propagation of a privilege requirement should be terminated;
outputting the one or more locations;
inserting a call to enable a privileged mode at the one or more locations in the code; and
refactoring the code.

2. The method of claim 1, wherein performing analysis on the code includes generating a method invocation graph that identifies paths of execution in the code as chains of method invocations.

3. The method of claim 2, wherein performing analysis on the code includes identifying a required permission for a chain of method invocations based on parameters associated with an authorization testing operation in the chain of method invocations.

4. The method of claim 3, wherein the authorization testing operation is a call to an AccessController.checkPermission( ) method.

5. The method of claim 2, wherein performing analysis on the code includes traversing each chain of method invocations in the method invocation graph to determine if any of the method invocations in the chain of method invocations satisfies one or more predetermined criteria.

6. The method of claim 5, wherein the one or more predetermined criteria include at least one of a first location in the chain of method invocations not needing the required permission, a package boundary, and a boundary between application code and library code.

7. The method of claim 1, wherein identifying one or more locations in the paths of execution of the code includes identifying one or more locations where an operation to enable a privileged mode is recommended to enable propagation of a privilege requirement up a path of execution.

8. The method of claim 7, wherein the operation is a call to an AccessController.doPrivileged( ) method.

9. The method of claim 1, wherein identifying one or more locations in the paths of execution of the code where propagation of a privilege requirement should be terminated includes:
   determining if a location in a path of execution satisfies a criteria; and
   identifying the location in the path of execution as a location where propagation of the privilege requirement should be terminated if the location in the path of execution satisfies the criteria.

10. The method of claim 9, wherein the criteria is a user definable criteria.

11. The method of claim 9, wherein the criteria is a boundary between application code and library code.

12. The method of claim 11, wherein the library code includes at least one of runtime code, shared libraries, middleware code, and operating system code.

13. The method of claim 1, wherein outputting the one or more locations includes writing the one or more locations to a data file.

14. The method of claim 1, wherein inserting a call to enable a privileged mode at the one or more locations in the code includes inserting a call to an AccessController.doPrivileged( ) method.

15. A computer program product recorded in a computer readable medium for optimizing code based on required permissions, comprising:
   first instructions for performing analysis on the code to identify paths of execution in the code;
   second instructions for identifying one or more locations in the paths of execution of the code where propagation of a privilege requirement should be terminated;
   third instructions for outputting the one or more locations;
   fourth instructions for inserting a call to enable a privileged mode at the one or more locations in the code; and
   fifth instructions for refactoring the code.

16. The computer program product of claim 15, wherein the first instructions for performing analysis on the code include instructions for generating a method invocation graph that identifies paths of execution in the code as chains of method invocations.

17. The computer program product of claim 16, wherein the first instructions for performing analysis on the code include instructions for identifying a required permission for a chain of method invocations based on a value passed to an authorization test in the chain of method invocations.

18. The computer program product of claim 17, wherein the value passed to an authorization test is a parameter associated with an AccessController.checkPermission( ) method invocation in the chain of method invocations.

19. The computer program product of claim 16, wherein the first instructions for performing analysis on the code include instructions for traversing each chain of method invocations in the method invocation graph to determine if any of the method invocations in the chain of method invocations satisfies one or more predetermined criteria.

20. The computer program product of claim 19, wherein the one or more predetermined criteria include at least one of a first location in the chain of method invocations not needing the required permission, a package boundary, and a boundary between application code and library code.

21. The computer program product of claim 15, wherein the second instructions for identifying one or more locations in the paths of execution of the code include instructions for identifying one or more locations where a call to enable a privileged mode is recommended to enable propagation of a privilege requirement up a path of execution.

22. The computer program product of claim 21, wherein the instructions for identifying one or more locations where a call to enable a privileged mode is recommended to terminate propagation of a privilege requirement up a paths of execution includes instructions for identifying one or more locations where a call to AccessController.doPrivileged( ) is recommended.

23. The computer program product of claim 15, wherein the second instructions for identifying one or more locations in the paths of execution of the code where propagation of a privilege requirement should be terminated include:
   instructions for determining if a location in a path of execution satisfies a criteria; and
   instructions for identifying the location in the path of execution as a location where propagation of the privilege requirement should be terminated if the location in the path of execution satisfies the criteria.

24. The computer program product of claim 23, wherein the criteria is a user definable criteria.

25. The computer program product of claim 23, wherein the criteria is a boundary between application code and library code.

26. The computer program product of claim 15, wherein the third instructions for outputting the one or more locations include instructions for writing the one or more locations to a data file.

27. The computer program product of claim 15, wherein the fourth instructions include instructions for inserting a call to an AccessController.doPrivileged( ) method.

28. An apparatus for optimizing code based on required permissions, comprising:
   means for performing analysis on the code to identify paths of execution in the code;
   means for identifying one or more locations in the paths of execution of the code where propagation of a privilege requirement should be terminated;
   means for outputting the one or more locations;
   means for inserting a call to enable a privileged mode at the one or more locations in the code; and
   means for refactoring the code.

* * * * *